United States Patent
Hahn et al.

(10) Patent No.: US 12,144,279 B2
(45) Date of Patent: *Nov. 19, 2024

(54) ROW UNIT WITH INTEGRATED PRESSURE SOURCE

(71) Applicant: Kinze Manufacturing, Inc., Williamsburg, IA (US)

(72) Inventors: Dustan Hahn, Tampa, FL (US); Matthew J. Wilhelmi, Parnell, IA (US)

(73) Assignee: KINZE Manufacturing, Inc., Williamsburg, IA (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/302,568

(22) Filed: May 6, 2021

(65) Prior Publication Data

US 2021/0251129 A1    Aug. 19, 2021

Related U.S. Application Data

(63) Continuation of application No. 16/270,147, filed on Feb. 7, 2019, now Pat. No. 11,026,363, which is a (Continued)

(51) Int. Cl.
*A01C 7/04* (2006.01)
*A01C 7/20* (2006.01)

(52) U.S. Cl.
CPC .............. *A01C 7/046* (2013.01); *A01C 7/20* (2013.01)

(58) Field of Classification Search
CPC ......... A01C 7/046; A01C 7/044; A01C 7/042; A01C 7/04; A01C 7/00; A01C 7/20
See application file for complete search history.

(56) References Cited

U.S. PATENT DOCUMENTS 3,999,690 A    12/1976   Deckler
9,622,402 B2    4/2017   Kinzenbaw
(Continued)

FOREIGN PATENT DOCUMENTS

DE        3208555 A  * 11/1983 ............ A01C 15/02
DE   202012101029      8/2013
(Continued)

OTHER PUBLICATIONS

International Searching Authority Search Report, Issued in connection to International Application No. PCT/US2015/015424, mailed Jun. 29, 2015, 13 pages. Apr. 6, 2015.

*Primary Examiner* — Christopher J. Novosad
(74) *Attorney, Agent, or Firm* — McKee, Voorhees & Sease, PLC

(57) ABSTRACT

An agricultural planter includes a plurality of row units attached to a toolbar. The row units include seed meters in seed meter housings for receiving, singulating, and dispensing seed or other particulate. The seed meters include a circular seed disc with a seed path for receiving the seed in the seed meter housing. Integrated with the seed meter, such as at the housing, is an electric pressure source dedicated to create a pressure differential for the seed meter or meters at a particular location on the planter. The pressure source can be positive or negative to temporarily adhere seed to the seed disc of the meter. A single pressure source can provide the pressure differential to a single meter or to multiple meters or discs at a row unit.

17 Claims, 13 Drawing Sheets

Related U.S. Application Data continuation of application No. 15/707,390, filed on Sep. 18, 2017, now Pat. No. 10,206,327, which is a continuation of application No. 14/679,388, filed on Apr. 6, 2015, now Pat. No. 9,763,380.

(60) Provisional application No. 61/975,047, filed on Apr. 4, 2014.

(56) References Cited

U.S. PATENT DOCUMENTS

| | | |
|---|---|---|
| 9,629,305 B2 | 4/2017 | Kinzenbaw et al. |
| 9,750,178 B2 | 9/2017 | Kinzenbaw et al. |
| 9,763,380 B2 | 9/2017 | Hahn et al. |
| 9,901,026 B2 | 2/2018 | Kinzenbaw et al. |
| 9,922,402 B2 | 3/2018 | Hirai |
| 10,206,327 B2 | 2/2019 | Hahn et al. |
| 10,225,977 B2 | 3/2019 | Kinzenbaw et al. |
| 10,244,674 B2 | 4/2019 | Kinzenbaw et al. |
| 10,257,975 B2 | 4/2019 | Kinzenbaw et al. |
| 10,667,462 B2 | 6/2020 | Kinzenbaw et al. |

FOREIGN PATENT DOCUMENTS

| | | | |
|---|---|---|---|
| EP | 1504642 A1 * | 2/2005 | ............ A01C 7/081 |
| EP | 2696667 | 10/2012 | |
| WO | 0183161 | 11/2001 | |
| WO | 2010129762 | 11/2010 | |

\* cited by examiner

ROW UNIT WITH INTEGRATED PRESSURE SOURCE

CROSS-REFERENCE TO RELATED APPLICATIONS

This application is a Continuation Application of U.S. Ser. No. 16/270,147, filed Feb. 7, 2019, which is a Continuation Application of U.S. Ser. No. 15/707,390, filed on Sep. 18, 2017, now U.S. Pat. No. 10,206,327, issued Feb. 19, 2019, which is a Continuation Application of U.S. Ser. No. 14/679,388, filed on Apr. 6, 2015, now U.S. Pat. No. 9,763,380, issued on Sep. 19, 2017, which claims priority under 35 U.S.C. § 119 of a provisional application Ser. No. 61/975,047 filed Apr. 4, 2014, which are hereby incorporated by reference in their entirety for all purposes.

FIELD OF THE INVENTION

The invention relates generally to agricultural implements for planting seed. More particular, but not exclusively, the invention relates to a row unit including a seed meter that includes an integrated pressure source, such as a vacuum source, to provide a pressure differential for adhering seed to a seed disc of the meter.

BACKGROUND OF THE INVENTION

An agricultural row crop planter is a machine built for precisely distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

In its most basic form, the seed meter includes a housing and a seed disc. The housing is constructed such that it creates a reservoir to hold a seed pool. The seed pool may also be in a separate structure. The seed disc resides within the housing and rotates about a generally horizontal central axis. As the seed disc rotates, it passes through the seed pool where it picks up individual seeds. The seeds are subsequently dispensed into a seed chute where they drop into the seed furrow.

Early seed meters were comprised of mechanical means of singulating seeds. These meters were constructed such that fingers on the face of the seed disc gripped seeds as they passed through the seed pool, subsequently releasing those seeds as they passed over the seed chute. Although these mechanical seed meters are effective, they are limited in their ability to assure singulation of seeds and are prone to dispensing duplicates (i.e., multiple seeds) and/or failing to dispense at all (i.e., skips or misses). Other mechanical meters use cells in conjunction with brushes to trap seeds within the cavity and release them over the seed chute.

Systems that are more recent include an air seed meter, e.g., vacuum or positive pressure meters, wherein the mechanical fingers have been replaced by a disc with apertures. A pressure differential is formed across opposite sides of the seed disc, which generates a suction force at the seed cell apertures. As unobstructed seed cells pass through the seed pool, seeds are drawn onto or against the seed cells and remain thereon until the seed cell passes through a region of the housing with a reduced pressure differential. To create this reduced pressure differential region, generally the "vacuum" (i.e., lower pressure) side of the seed disc is exposed to air pressure near, but not always at, atmospheric levels.

At this point, seeds are released from the seed cell of the seed disc and into the seed chute. Compared to mechanical meters, air seed meters promote improved singulation across a wider range of speeds. A problem that exists with an air seed meter is that it can be difficult for the suction (negative) force or positive air force of the seed cell to draw or push seeds from a stagnant seed pool. Another problem with air seed meters, and specifically the seed disc, is that seeds not released at or near the edge of the seed disc are susceptible to increased ricochet or bounce, thereby negatively impacting seed spacing. For those air seed meters that do release seeds from at or near edge of the seed disc, seeds are sometimes knocked free of the cells on the seed disc by the seed meter housing sidewall because of the close proximity of the housing sidewall to the cell.

Furthermore, the fluid source, which may be a positive air source or a vacuum source, is generally a large device that supplies the air or vacuum pressure to multiple, if not all, of the row units of a planter. This requires a large pressure source, as well as a large number of hoses extending from the pressure source(s) and the row units. This creates clutter on the planter, which increases with the number of row units and/or seed meters on a planter. In addition, due to the sometimes long distances between the pressure source and the row unit, as well as the current state of and inefficiency of fans and vacuum distribution on planters, there may be a pressure drop, which can affect the efficiency of the fluid pressure at the row unit. To account for this drop, the pressure may need to be higher at the source, which requires more power as well.

Therefore, there is a need in the art for a row unit of a planter that includes an electric, integrated air pressure source at a row unit for providing a positive or negative pressure for the one or more seed meters of the row unit. The pressure source can include an electric motor and pressure generator on and/or integral to the row unit and/or seed meter.

SUMMARY OF THE INVENTION

Therefore, it is a principal object, feature, and/or advantage of the invention to overcome the deficiencies in the art.

It is another object, feature, and/or advantage of the invention to provide a row unit an agricultural implement with an integrated pressure source for providing a pressure differential for a seed disc thereof.

It is yet another object, feature, and/or advantage of the invention to provide an electric, dedicated pressure source for each seed disc of a seed meter of a row unit.

It is still another object, feature, and/or advantage of the invention to provide a pressure source for providing a pressure differential to multiple seed discs of a common seed meter of a row unit.

It is a further object, feature, and/or advantage of the invention to provide a pressure source comprising an electric motor and air source at a row unit of an agricultural planter.

It is still a further object, feature, and/or advantage of the invention to provide a pressure source at a seed meter that includes an air cleaning apparatus to clean the air being used by the pressure source and/or air that is exhausted by the seed meter.

It is yet a further object, feature, and/or advantage of the invention to provide an electrically powered pressure source at a row unit that includes components capable of separating the pressure between multiple seed discs.

It is still a further object, feature, and/or advantage of the invention to provide a pressure source for a seed meter that is configured to dispense different types of seed, seed hybrid, or the like, from a single or plural housing.

These and/or other objects, features, and advantages of the invention will be apparent to those skilled in the art. The invention is not to be limited to or by these objects, features and advantages. No single embodiment need provide each and every object, feature, or advantage.

According to some aspects of the invention, a row unit of an agricultural planter includes an integrated, electric fluid pressure source. The pressure source may be integrated with the row unit, or a portion of a seed meter or seed meters of the row unit. Some aspects include a seed meter that comprises a housing with a single seed disc that is rotatably positioned within the housing. Other aspects include a single seed meter housing with a plurality of seed discs within the housing. Still other aspects include multiple seed meters with multiple housings, each including one or more seed discs therein.

The seed discs are able to rotate within the seed meter(s). The discs include a plurality of seed apertures comprising seed cells. The seed apertures can be radially spaced to form a seed path. In addition, according to some aspects, the seed disc or discs may include a plurality of seed paths on each disc, which will allow for the invention to be used with generally any type, shape, hybrid, or number of seeds to be planted by an agricultural implement including aspects of the invention.

As they seed disc(s) rotate with the housing(s), the seed path passes through one or more seed pools, which are locations of seed buildup in the seed housing that can be fed via a hopper at the row unit, from one of a plurality of hoppers at the row unit, or from an air seed delivery, which can comprise one or more seed tanks connected to the row units. The electric, integrated pressure source creates a pressure differential, such as a pushing air force or a vacuum force, at the seed apertures. This causes a seed from the seed pool to temporarily adhere at the seed aperture. The seed disc continues rotation, and can move a seed through a location where there is no pressure differential or forces acting on the seed. At such a location, the seed can be removed, such as naturally by gravity, mechanically, other mechanism, or some combination thereof. The seed is then moved to a furrow or trench created in the ground, such as by a seed tube or other conveying means.

Because the pressure source is electrically powered and integrated with the row unit and/or seed meter, the source can be more efficiently controlled to provide the necessary pressure differentials for the planting of one or more seed types, hybrids, varieties, etc., by the meter or meters of the row unit. In addition, the independent control of the pressure source will allow for a cleaner look of the planter, allow for varying amounts of pressure at each seed meter, allow for controlled pressure forces for different types of seed, and even provide that cleaner air is used for the pressure and/or exhaust of pressure for a seed meter.

Various configurations of row units and/or seed meters are contemplated. For example, a single meter with a single seed disc can include a single air pressure source. A single meter housing with a plurality of seed discs can include a single pressure source with multiple ducts for providing positive or negative pressure to the seed discs. A single meter housing with a plurality of seed discs can include a separate pressure source for each seed disc to provide the necessary or desired pressure thereat. A single pressure source can have air pressure that is bifurcated to a plurality of seed discs simultaneously. A single pressure source can include automated or otherwise controlled valves or baffles to route air to or from one of a plurality of paths to supply pressure to one of the plurality of seed discs of a seed meter at a time. Still other configurations are contemplated.

In addition, a filtration system can be integrated with the row units and/or seed meters to clean the air before or after use in the seed meter. For example, aspects of the invention contemplate the integration of a cyclonic-type dust separator, otherwise known as cyclonic separation, for one or all of the pressure sources. Such an air cleaning apparatus is able to reduce debris that could otherwise enter the air source, which can increase the durability of the fan, motor, seed meter, and other components thereof.

Furthermore, an exhaust air cleaning device can also be incorporated and integrated with a meter and/or row unit. The cleaning device, which can be a cyclonic dust separator, or similar system, can be operatively attached to the exhaust of a meter to capture exhausting meter air to reduce seed dust, seed coatings, or other particles that could possibly contain airborne pesticides or other products or chemicals that can harm the environment, i.e., the field being planted.

Figure 1:
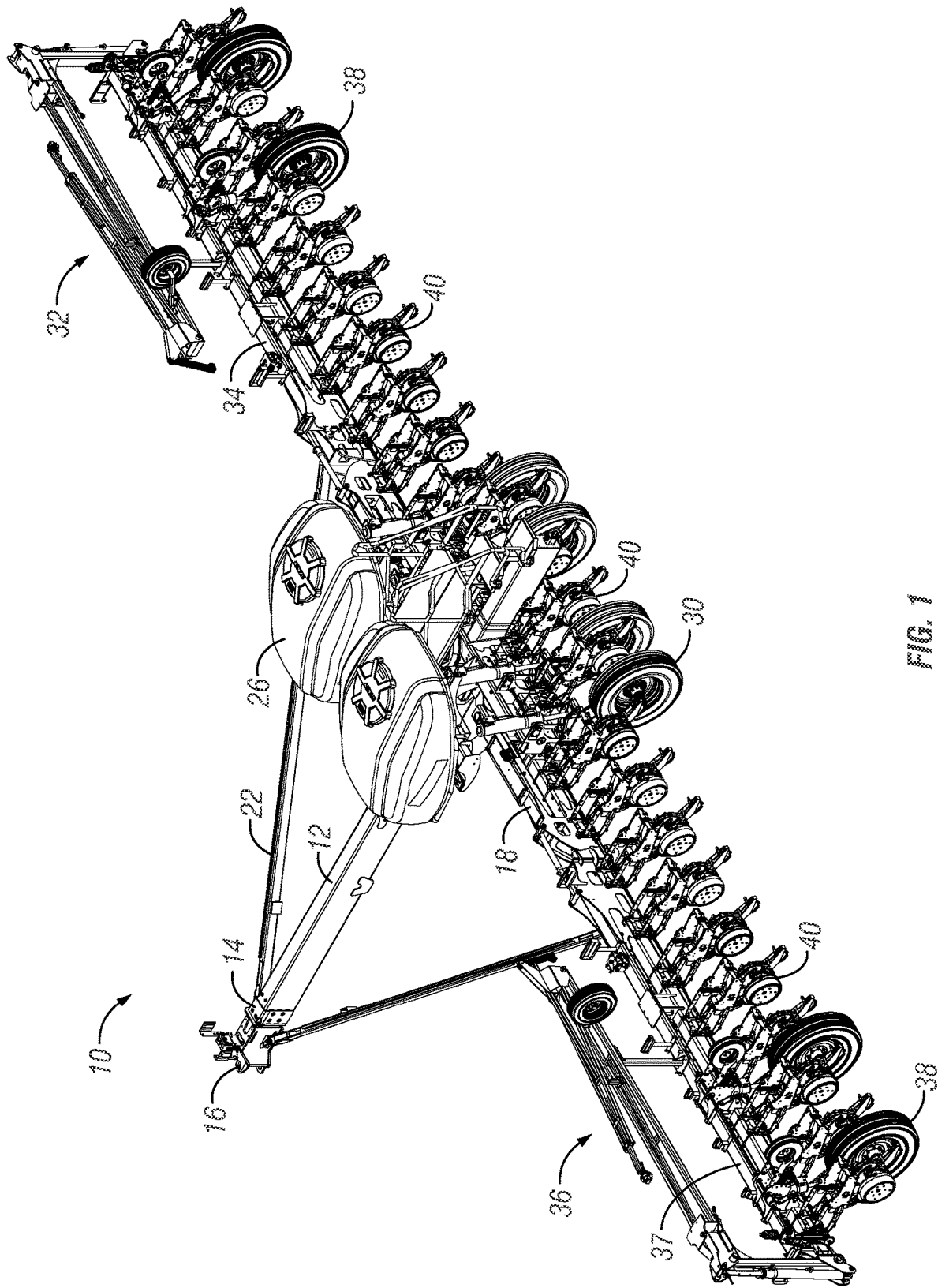
FIG. 1 is a perspective view of a planting implement.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

FIG. 1 is a perspective view of an exemplary embodiment of an agricultural implement 10, which is shown as a planting implement. Such a planter 10 is further shown and described in U.S. patent application Ser. No. 13/927,177, which is hereby incorporated in its entirety. FIG. 1 shows the planter 10 with a tongue 12, which may be a telescoping tongue when the planter 10 is a forward folding planter. A hitch 16 is positioned at the first end 14 of the tongue 12, and is used to attach the planting implement 10 to a tractor (not shown) or other vehicle for pulling the planting implement 10. When the tongue 12 is a telescoping tongue, it may be aided by the addition of draft links 22 on opposite sides of the tongue 12. The draft links 22 connect the tongue 12 to first and second wings 32, 36, such that when the wings fold by operation of cylinders, the draft links 22 will extend or retract sections of the telescoping tongue 12 to lengthen or shorten the tongue 12 so that the wings 32, 36 are able to be folded adjacent one another and the tongue 12.

Positioned at or near a rear end of the tongue 12 is a main or central frame 18. The main or central frame 18 extends generally perpendicular to the tongue 12. The central frame 18 also includes structure for central hoppers 26. The central hoppers 26, which may also be known as bulk fill hoppers, central hoppers, or other tanks, house materials, such as seed, insecticide, fertilizer, or the like, which is distributed through a system to individual row units on the frame and wings. For example, the bulk fill hoppers 26 may be operatively connected to an air seed delivery system for delivering seed from the bulk fill hoppers to individual row units. Such an air seed delivery system is disclosed in U.S. Pat. No. 8,448,585, which is hereby incorporated in its entirety. Furthermore, the hoppers 26 may contain one single type of seed, or may contain a plurality of types, hybrids, and/or varieties of seed. The central fame 18 includes a plurality of row units 40 extending from the rear of the frame to distribute the material to a field. The central frame 18 also includes an axle and transport wheels 30 extending from the frame 18. The transport wheels 30 support the main or central frame, and are also the wheels that contact the ground when the implement 10 is transported to or from a field.

Extending from opposite sides of the central frame or main frame 18 is first and second wings 32, 36. The first and second wings 32, 36 generally mirror one another, and therefore, only one wing 32 will be described. It should be appreciated that opposite wing 36 comprises generally the same components. The first wing 32 includes a first frame 34 extending separate from, but extending generally in the same plane as the main frame 18. A plurality of row units 40 are connected to the first frame 34. The row units 40 of the first wing 32 are generally the same as the row units of the main frame 18 and that of the opposite wing 36, which extend from the second wing frame 37. The number of row units 40 for use with the implement 10 may vary depending on the size of the implement 10, the requirements of the field, type of field, the type of material being distributed to the field, and the like. Also extending from the first wing frame 34 are wing wheels 38. The wing wheels 38 support the wings 32, 36 and allow the implement 10 to be moved without the row units penetrating the ground when turning in the field, crossing waterways, or the like.

Figure 2:
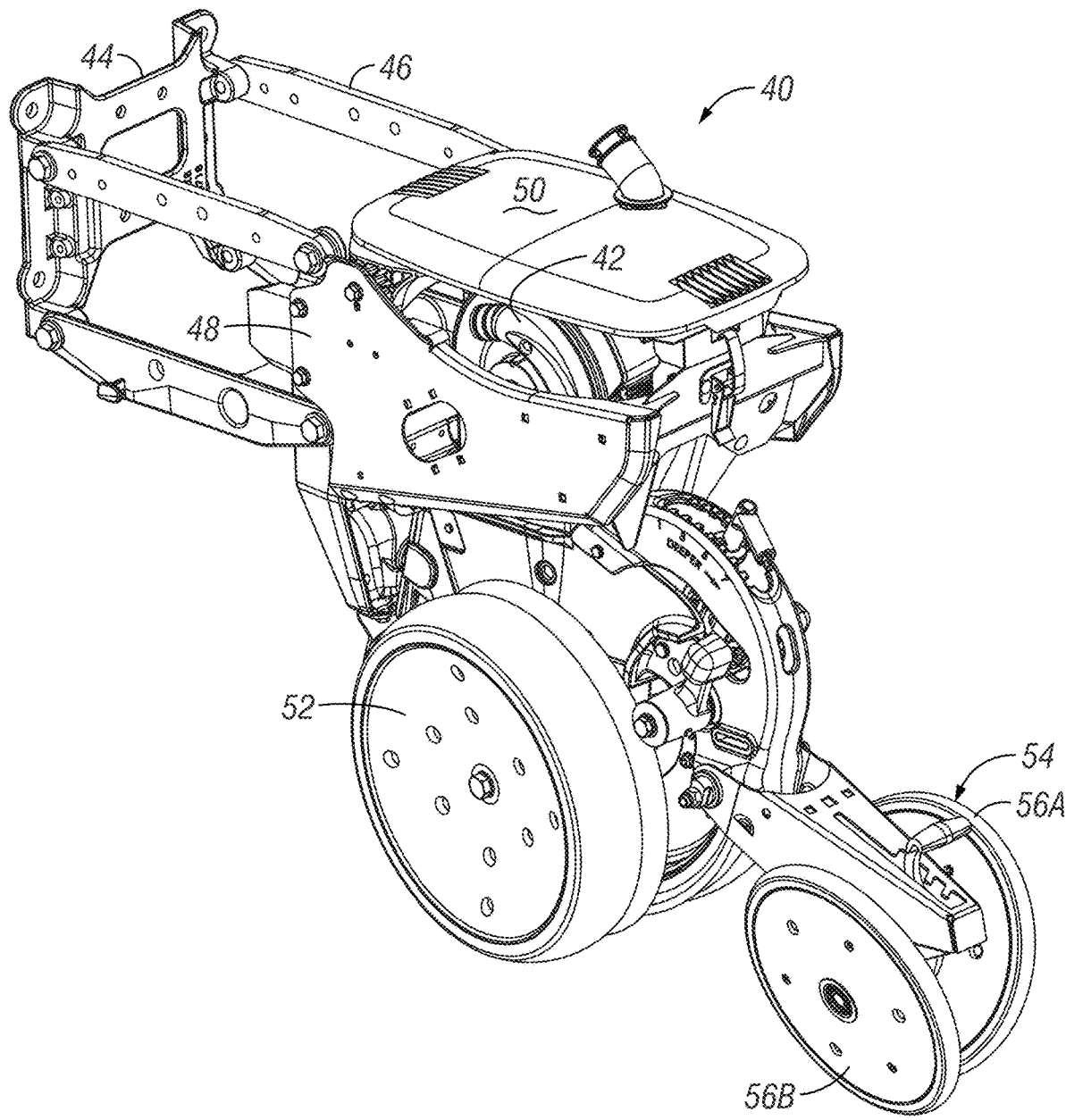
FIG. 2 is a perspective view of a conventional planter row unit with an air seed meter attached thereto.
Figure 3:
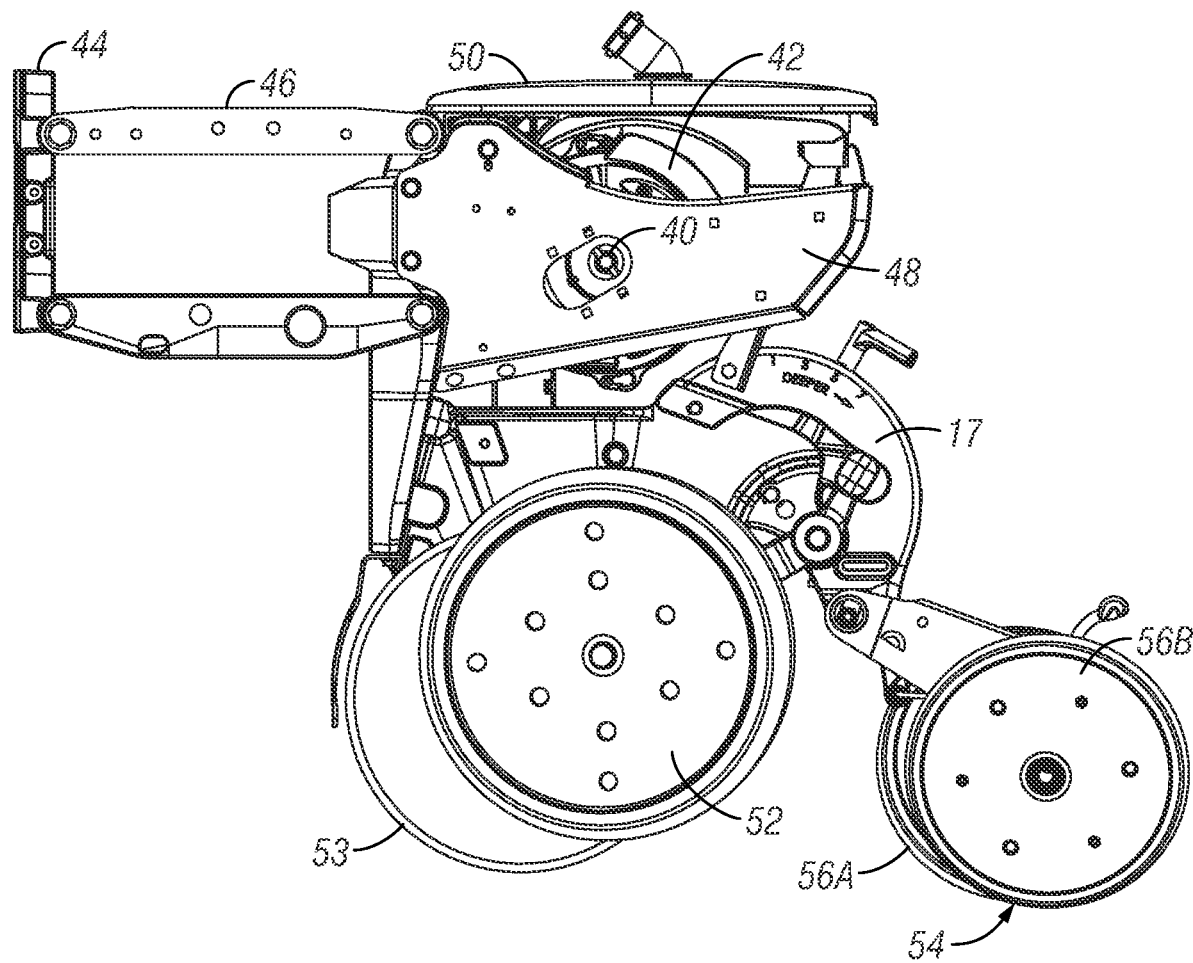
FIG. 3 is a side elevation view of the conventional row unit of FIG. 1.

As mentioned, the implement 10 includes a plurality of row units 40 extending from the wings 32, 36 and the central frame 18. A conventional planter row unit 40 with an air seed meter 42 positioned therewith is shown in FIGS. 2 and 3. For example, the seed meter 40 may utilize a negative or positive air pressure to retain and transport seed about one or more seed discs within the seed meter housing. The row unit 40 and air seed meter 42 may be of the kind shown and described in U.S. patent application Ser. No. 13/829,726, which is hereby incorporated in its entirety. The invention contemplates other types of seed meters, including mechanical, brush, finger, or the like, which may be used with the invention. In addition, as will be understood, the seed meter may be a multi-hybrid seed meter that is capable of dispensing one of a plurality of types, varieties, hybrids, etc. of seed at a row unit, such as by the use of multiple seed discs within the seed meter housing.

The row unit 40 includes a U-bolt mount (not shown) for mounting the row unit 40 to the planter frame or tool bar (on central frame and wings), as it is sometimes called, which may be a steel tube of 5 by 7 inches (although other sizes are used). However, other mounting structures could be used in place of the U-bolt. The mount includes a face plate 44, which is used to mount left and right parallel linkages 46. Each linkage may be a four bar linkage, as is shown in the figures. The double linkage is sometimes described as having upper parallel links and lower parallel links, and the rear ends of the parallel links are pivotally mounted to the frame 48 of the row unit 40. The frame 48 includes a support for the air seed meter 42 and seed hopper 50, as well as a structure including a shank for mounting a pair of ground gage wheels 58. The frame 48 is also mounted to a closing unit 54, which includes a pair of inclined closing wheels 56A, 56B. The row unit 40 also includes a pair of opener discs 53. While the row unit 40 shown in FIGS. 2 and 3 is configured to be used with a bulk fill seed system, it is to be appreciated that the row unit 40 may have one or more row hoppers 50 at each of the row units 40. Exemplary versions of row units with individual hoppers is shown and described in U.S. Patent Application No. 61/763,687, which is hereby incorporated in its entirety.

As mentioned, the implement 10 and row units 40 shown and described in FIGS. 1-3 include an air seed meter 42 for singulating and transporting seed or other particulate material from the seed delivery source to the created furrow in the field prior to the closing wheels 56 closing said furrow.

Figure 4:
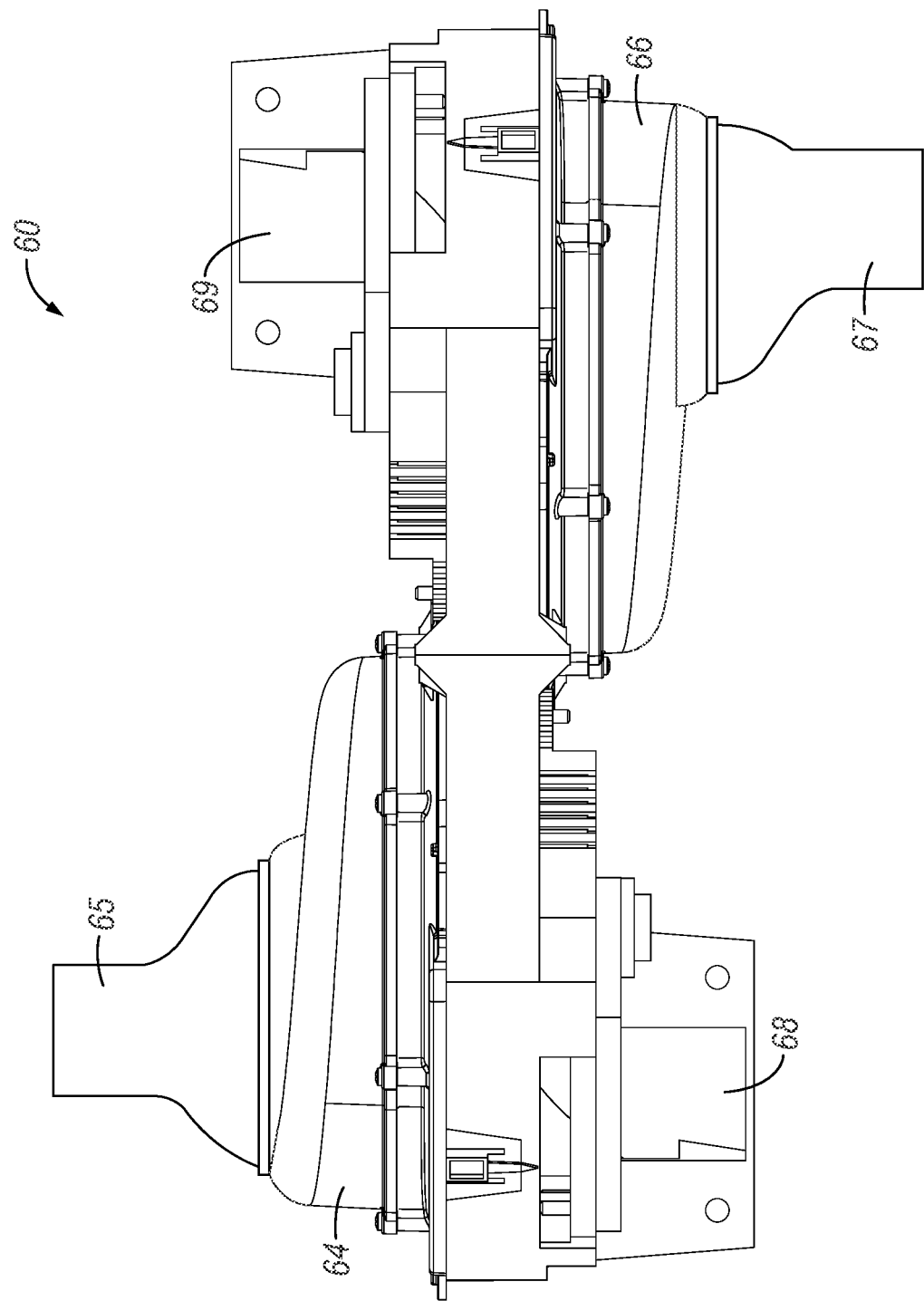
FIG. 4 is a top elevation view of a seed meter with standard pressure source connections.
Figure 5:
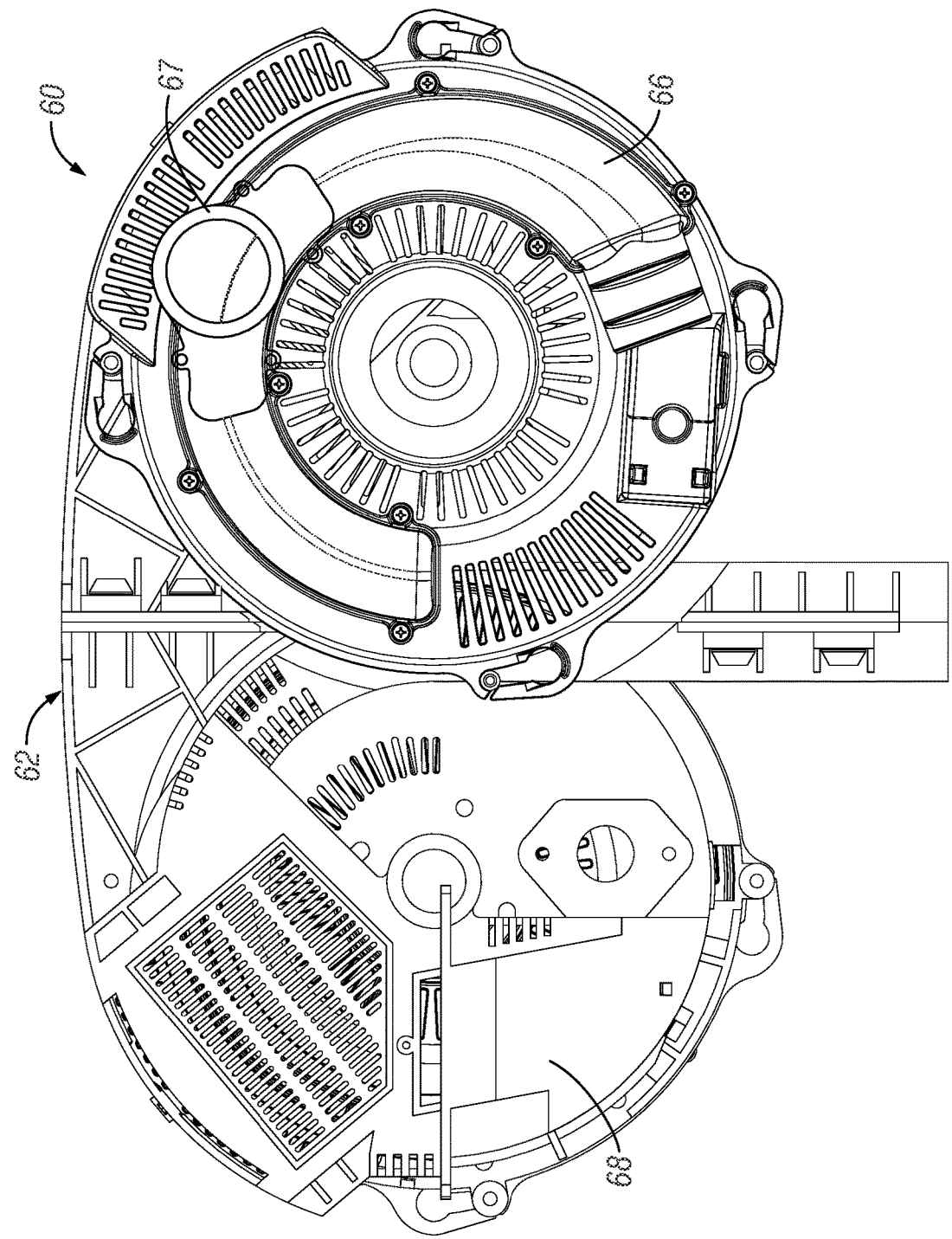
FIG. 5 is a side elevation view of FIG. 4.

A seed meter 60 with traditional air pressure source access members 62, 63 is shown in FIGS. 3 and 4. The seed meter 60 shown in FIGS. 3 and 4 includes a base or central housing 62 for accompanying first and second seed discs positioned within said housing. Thus, the seed meter 60 is shown to be a multi-hybrid seed type seed meter 60, wherein the seed meter is able to singulate and dispense at least two different types, hybrids, or varieties of seed by the planter as the planter moves through the field. The central housing 62 is a member that is generally mirrored sides or ends. A first meter housing 64 is shown to be positioned on one side, and a second meter housing 66 is shown to be positioned on an opposite side of the central housing 62. A first seed disc is positioned between the first meter housing 64 and the central housing 62, and these components may be collectively known as a "first meter", and a second seed disc is positioned within and between the second housing 66 and the central housing 62, and these components may be collectively known as a "second meter". In such a configuration, it has been standard to provide a centralized or regional air pressure source to provide an air pressure, whether it be positive or negative, for the seed disc. The seed meter 60 on a particular row unit (not shown) is connected to the central or regional air pressure source via hoses, which are not shown in the figures. The hoses attach to a first pressure source member 65 and a second pressure source member 67, as shown in the figures. Thus, the hoses must extend at times a substantially large distance. This can create clutter and an undesired look for a planter, in addition to adding the possibility of loss of pressure over the distance of the hose.

For example, the hoses must extend from the centralized or regional air pressure source and to row units that may be at the ends of the wings. When a centralized air pressure source is used, the pressure source may be positioned on the central frame of the planter, such as near the bulk hoppers. Otherwise, regional air pressure sources may be positioned at each of the wings of a planter. In either situation, particularly row units may be positioned a substantial distance from said air pressure source. Due to the distance, the air pressure may experience a drop or a loss between the source and the particularly seed unit 60 of a row unit. Therefore, the pressure source may be required to have a higher power or provide a higher source to account for said drop. This can provide a large power or energy requirement for a particular planter.

Figure 6:
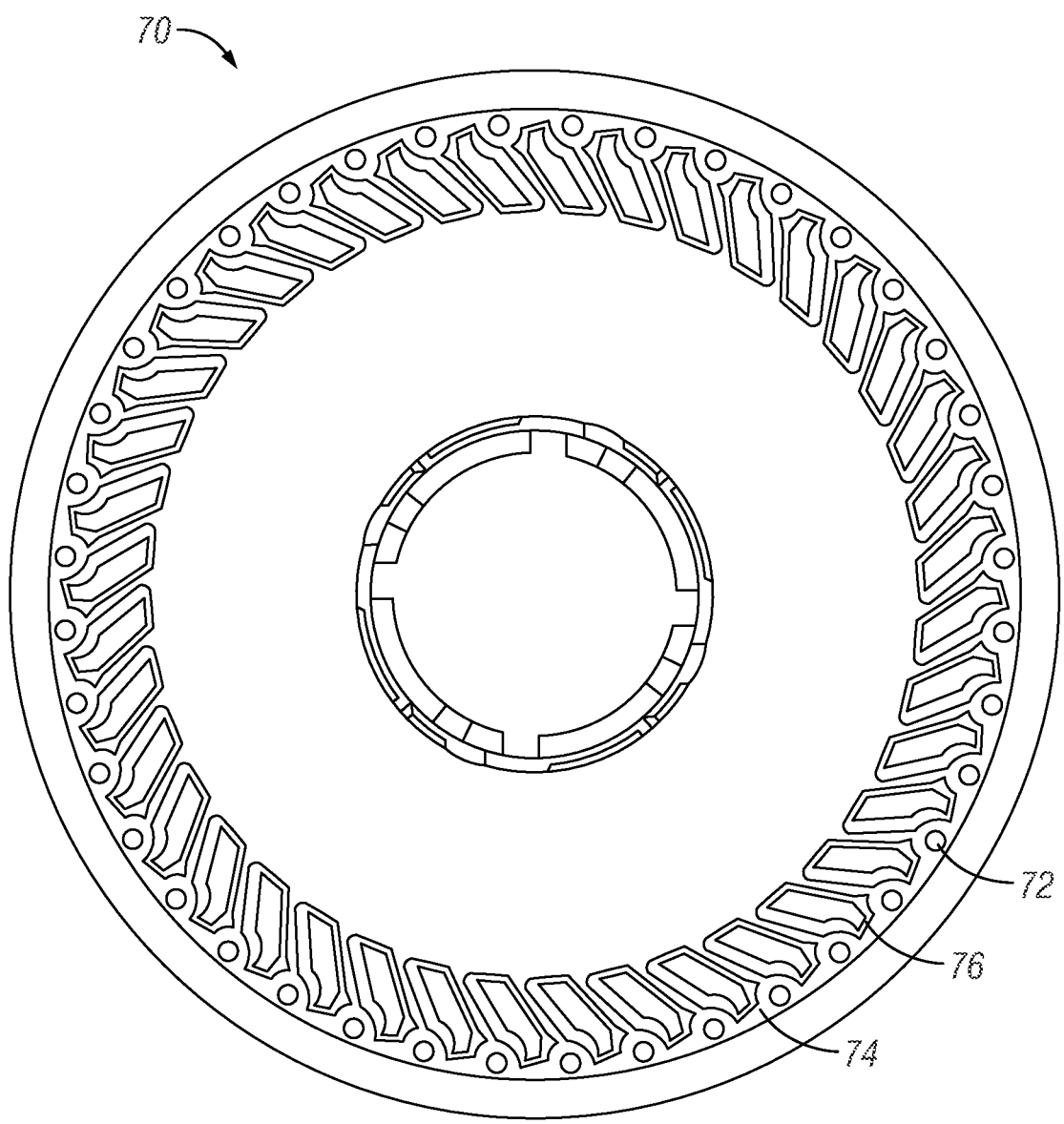
FIG. 6 is a view of a seed disc for use with a seed meter.

In operation, the seed discs of the first and second meters 64, 66 rotate within the housing of the seed meter assembly 60. The discs, such as the disc 70 shown in FIG. 6, include radially spaced seed apertures 72. The seed apertures 72 can varied according to the type of seed, variety of seed, size of seed, coating of the seed, and the like to account for variations in the seed. A plurality of seed apertures 72 form a seed path 74, which is created when the seed disc 70 is rotated. Furthermore, the seed disc 70 may include channels 76, which can be used to aid in agitating a seed pool to direct seed from the seed pool toward the seed apertures 72, in order to aid in providing the seed at the aperture at the point of the pressure differential or positive pressure in order to temporarily adhere the seed at the aperture 72. It should be appreciated that while the seed disc 70 is shown for exemplary purposes, other types of seed disc, including other configurations of seed apertures, seed paths, channels, and the like may be included with any of the embodiments and/or aspects of the invention, and the seed disc itself is not to be limiting to the invention. Instead, it is shown to aid in understanding the invention.

Accordingly, in use with a seed meter 60, the seed disc 70 may rotate such that the seed apertures 72 pass through a first or second seed pool 68, 69 of the meter 60. Adjacent said seed pools 68, 69 the pressure source members 65, 67 will begin providing either a positive or negative force to temporarily adhere a seed at a seed aperture 72. The seed disc 70 continues rotation until a point where there is no pressure differential, such as by an open portion on both sides of the seed meter housing, at which point the seed will be released from said seed aperture. The seed can then be dispensed from the seed meter, such as by a seed chute and/or seed tube, or other conveying means. Such conveying means that can be used with the invention include those disclosed in U.S. patent application Ser. No. 14/619,758, which is hereby incorporated by reference in its entirety. However, it should be appreciated that any type of seed to furry delivery can be used with the invention, including, but not limited to, seed belts, chutes, gravity, brushes, rollers, or any multiples or combinations thereof. The seed is directed towards a furrow or trench created in the ground by the other components of the row unit in order to plant said seed at a desired location and depth, and with the desired spacing between subsequent and past seeds.

Figure 7:
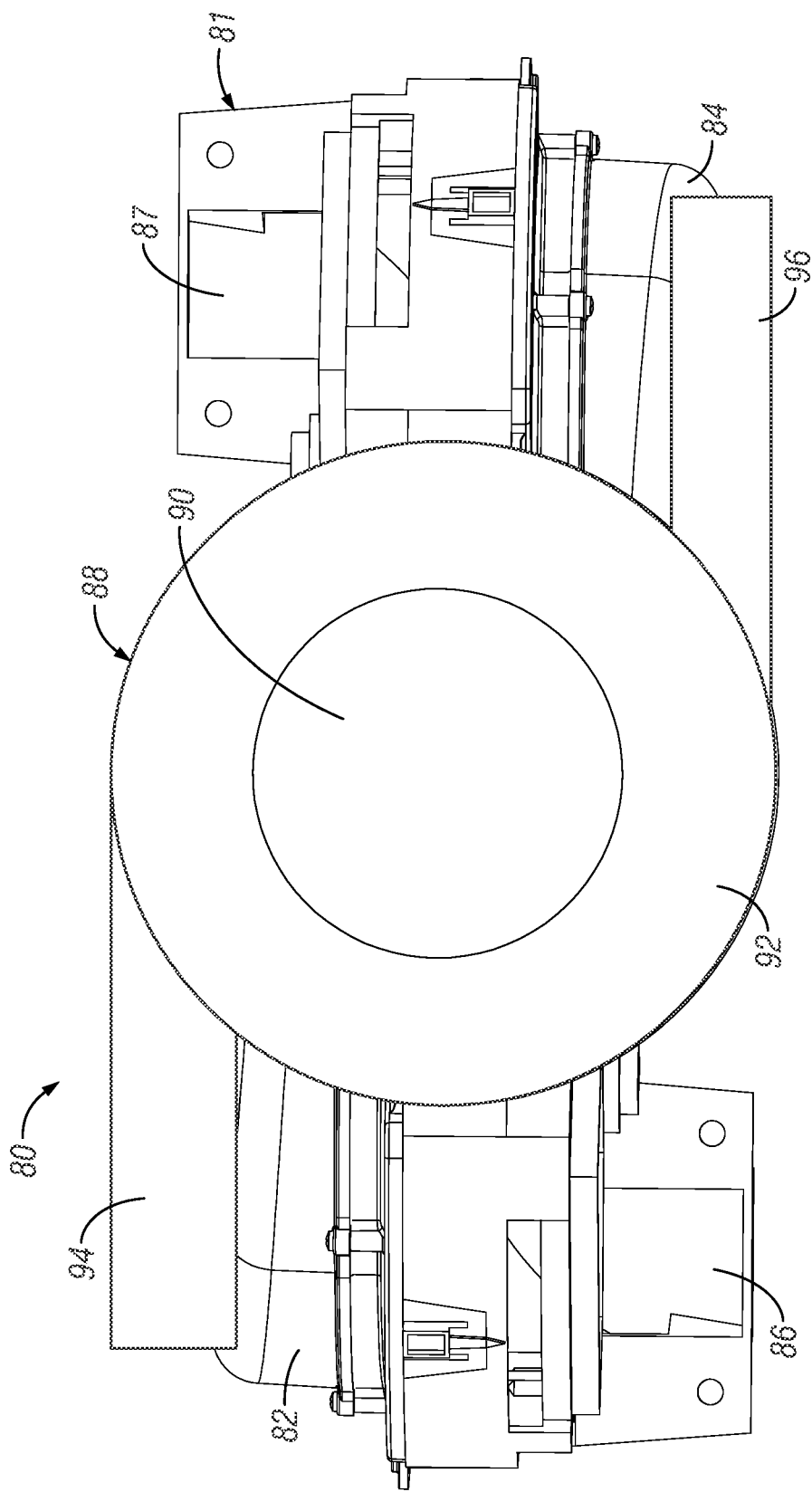
FIG. 7 is a top elevation view of a seed meter with two seed discs and a single air pressure source integrated with the meter housing.
Figure 8:
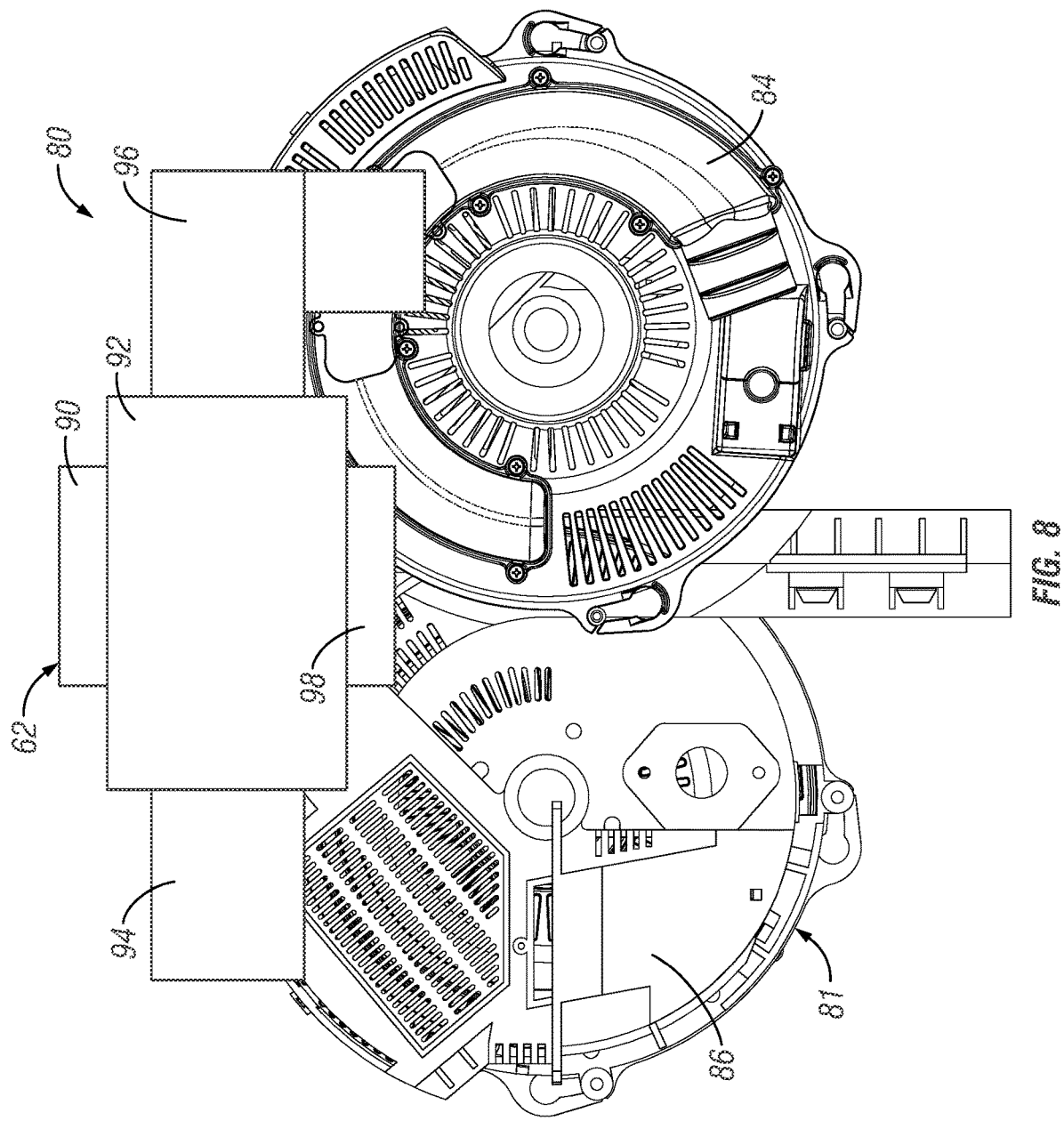
FIG. 8 is a side elevation view of the seed meter of FIG. 7.

In order to overcome issues with long hoses and the possibility of air pressure loss, aspects of the invention can be seen in FIGS. 7 and 8, in which a system is provided to eliminate the need for the long hoses, which will reduce clutter and too many components on a tractor or implement, reduce the power or energy needed, and while also increasing the efficiency of the seed meters of the row units. In addition, the aspects as will be shown and described will allow for a near infinite variability of the planting of each of the seed meters of the row unit, which will allow a planter to plant variable seed types, hybrids, seed varieties, seed populations, and the like, all within the same field and without changing components of the planter, which all aid in increasing the yield of a crop over a particular planting season. Therefore, as shown in FIGS. 7 and 8, aspects of the invention provide for the integration of a pressure source at the row unit and/or seed meter. The integration of the pressure source will utilize the increasingly electronic or electric capabilities of planters, as they move from purely mechanical to more electric configurations, and instead, include electric power supplies, electric motors, and other electric components.

Accordingly, FIGS. 7 and 8 show a seed meter assembly 80 with an integrated pressure source 88 operatively attached thereto and integrated therewith. The seed meter assembly 80 is substantially similar to that shown previously in that it includes a central housing 81. Attached to the central housing is a first meter housing 82, which covers a first seed disc rotatably mounted therein (known collectively as a first meter 82), as well as a second meter housing 84, which houses a second seed disc rotatably mounted therein (known collectively as a second meter 84). In addition, the seed meter assembly 80 includes a first seed pool 86 for receiving seed to be singulated and dispensed by the first seed meter 82, as well as a second seed pool 87, for interaction and dispensing of seed via the second seed meter 84.

The pressure source 88 can be an electrically powered pressure source, such as an electrical fan or vacuum generator. The pressure source 88 can comprise an electric motor 90 and a vacuum fan or air source 92 connected thereto. Therefore, there will be no hoses extending along the planter for connecting to the seed meters 82, 84, and instead, there will be some electrical connection between an electrical power source and the seed meter assembly 80. However, as seed meters are becoming increasingly electrically driven, such as by electrical motors, the electrical power will already be running to said seed meter, and thus, little to no changes will need to be made to said agricultural implement for the inclusion of the integrated pressure source 88. The pressure source 88, as has been mentioned, can be a positive pressure source, such as a fan, or a negative pressure source, such as a vacuum motor. For example, a vacuum assembly could be utilized with the electrical motor 90 to provide the negative pressure source. Such examples of vacuum motors could be electrically powered motors running on 48 volts, with 10 to 15 amps required to operate said motors. However, other types of fans, including pancake fans and other blowers as well as other vacuum or fan sources could be utilized to provide the air pressure for the seed meter 80. An example of such a motor that could be used with the invention is a Domel brand brushless blower/pump, model number 497.3.267, which is a low voltage motor (24 V DC, 36 V DC, 52 V DC). However, other models and manufacturers of positive or negative pressure fans could be used.

Furthermore, the seed meter assembly 80 shown in FIGS. 7 and 8 include a first duct 94 and a second duct 96 extending generally between the pressure source 88 and a portion of the first meter 82 and second meter 84. Therefore, according to some aspects of the invention, an integrated air pressure source (electric fan) for the seed meter assembly 80 could be utilized that pulls air through the apertures of a seed disc to load seed to the disc (e.g., vacuum meter). In other aspects, an integrated air pressure source 88 (electric fan) for the seed meter 80 could be utilized that pushes air through the apertures of the seed disc to load seed to the disc (e.g., a positive pressure meter). The pulling or pushing of the air can be done through the ducts 94, 96 from the fan 92 to provide the air pressure to the discs housed within the seed meter housing 81, 82, 84. For example, in some aspects of the invention, the single pressure source 88 could be bifurcated or otherwise divided among any number of ducts to provide the air pressure to the meters 82, 84 simultaneously. The simultaneous provision of the air pressure will ensure that the air pressure will be there when one or the other of the seed discs will be activated to singulate and dispense the seed provided from the seed pool 86, 87, without a lag or delay of a pressure building up to allow the seed to adhere at the seed disc. However, as will be understood, other aspects of the invention provide that a single pressure source 88, such as that shown in FIGS. 7 and 8, can be controlled such that the air pressure provided by the fan 92 is provided to only one of the seed discs at a time, such as by baffles, valves, or the like. When more than two meters are positioned at a particular row unit, additional ducts can extend such that the pressure source 88 provides simultaneous or controlled air flow to any additional seed meter as well.

The pressure source 88 shown in FIGS. 7 and 8 provide for independently adjustable vacuum/positive pressure systems. For example, different seed types, varieties, hybrids, and the like may require different levels of air pressure in order to best adhere the seed at the seed aperture as the seed disc rotates within the meter housing. Therefore, the integration of the pressure source at the seed meter and/or row unit will provide for each seed meter of each row unit having independent air pressure to provide the desired and/or best air pressure for the particular type of seed being singulated and dispensed with the particular seed meter of a row unit.

The operation of the seed meter assembly 80 can be as follows. Each seed disc housed within the central housing 81 and either the first meter housing 82 or the second meter housing 84 can be associated with a different seed type, hybrid, variety, or the like. For example, two seed hybrids may be utilized in the field to account for varying field conditions. A seed supply can be operatively connected to each of the meters, 82, 84, such as by individual hoppers at the row unit, air seed delivery systems, or some combination thereof. Seed is collected in the seed pools 86, 87. The seed meters 82, 84 can each include an independently controlled electric motor in order to rotate the seed disc housed within the meters 82, 84. The pressure source 88 is provided to apply the air pressure to the seed meters 82, 84 as the planter is transported through a field. As the planter moves through the field, one of the seed meters 82, 84 of a row unit is operated based upon the field conditions to plant one of the types, varieties, and/or hybrids of the seed associated with the seed meter assembly 80. In addition, some row units may not be activated at all, such as in locations where the field is not to be planted. The pressure source 88 provides the pressure to one or both of the seed meters 82, 84, the seed meter motors are activated to rotate, and the seed disc housed within rotates through the associated seed pool to adhere seed at the seed apertures. The seed is singulated, and dispensed from the seed meter into a furrow: When the other seed associated with one of the other meters is to be planted, the first seed meter is turned off, and the next seed meter is activated to begin rotation through the seed pool to singulate and dispense the associated seed therefrom. The pressure source 88 will be able to provide the air force pressure to both (or more) of the seed meters 82, 84 such that there will be no interruption in the planting from the seed meters of the assembly 80 when a particular seed meter is switched from one to the other, such as from the first seed meter 82 to the second seed meter 84. In addition, as the integrated pressure source 88 is electrically powered, the seed meters of the assembly 80 can be independently controlled, in the case that a different air pressure is required when changing from one seed to the other to be planted by the seed meter assembly 80.

Furthermore, it should be appreciated, that while two seed discs and seed meters are associated with the seed meter assembly 80 shown in FIGS. 7 and 8, the invention is not to be limited to such a situation or configuration. For example, the integration of the air pressure source at the seed meter and/or row unit could be utilized with a seed meter incorporating a single disc and meter combination. Furthermore, the invention contemplates that the integration of the pressure source could be utilized with more than two seed meters and associated seed discs at a particular row unit. In such a situation, the pressure source 88 will include additional air ducts to extend between the pressure source 88 and the additional seed meters. However, as the pressure source is electrically powered and integrated with a particular row unit, the planter will have a cleaner look, will be more efficient, will be independently variable, and will provide additional advantages, benefits, and the like over current situations. Additional advantages obvious to those skilled in the art will also be provided.

Figure 9:
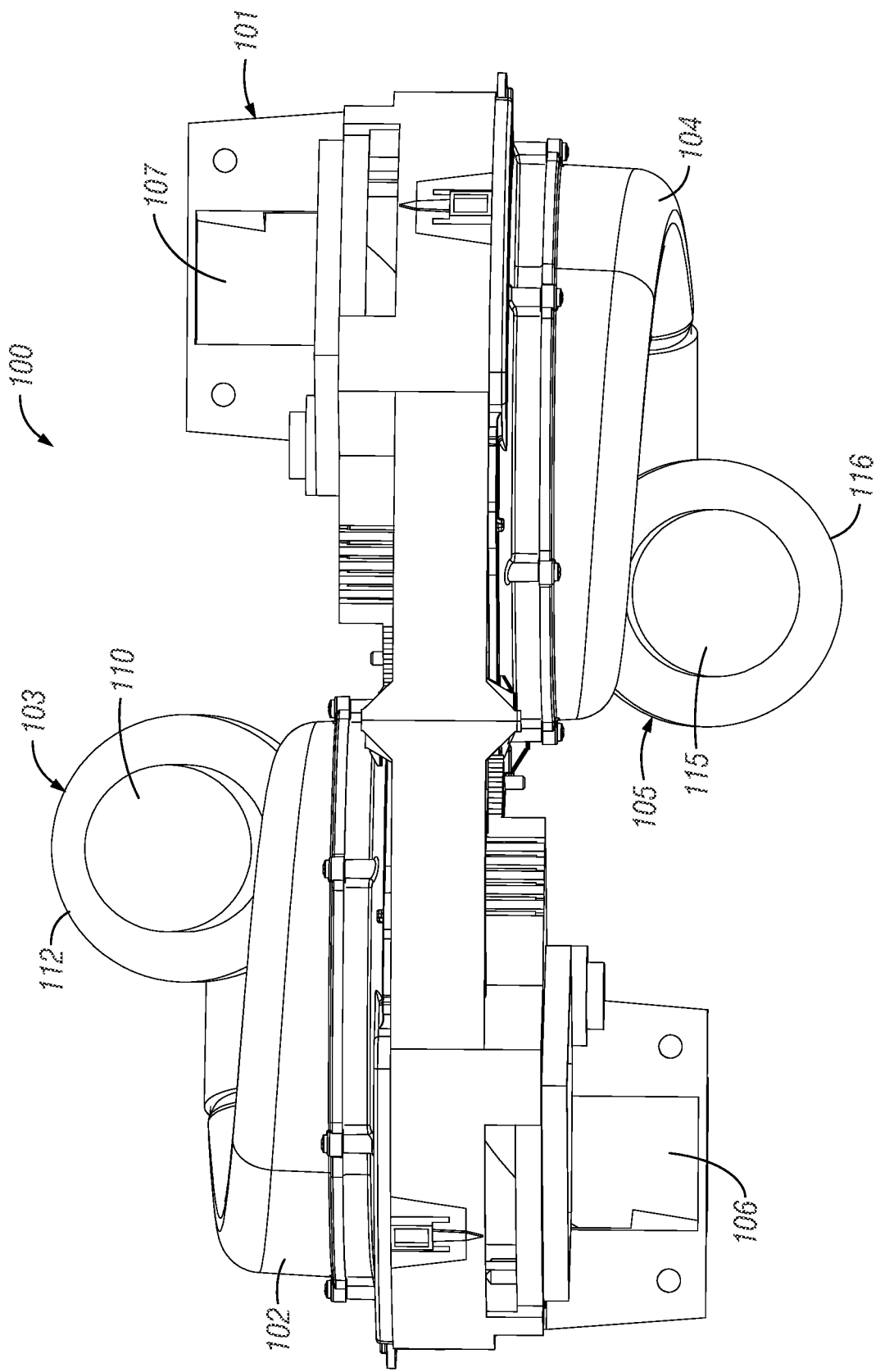
FIG. 9 is a top elevation view of a seed meter with two seed discs and two air pressure sources integrated with the meter housing.
Figure 10:
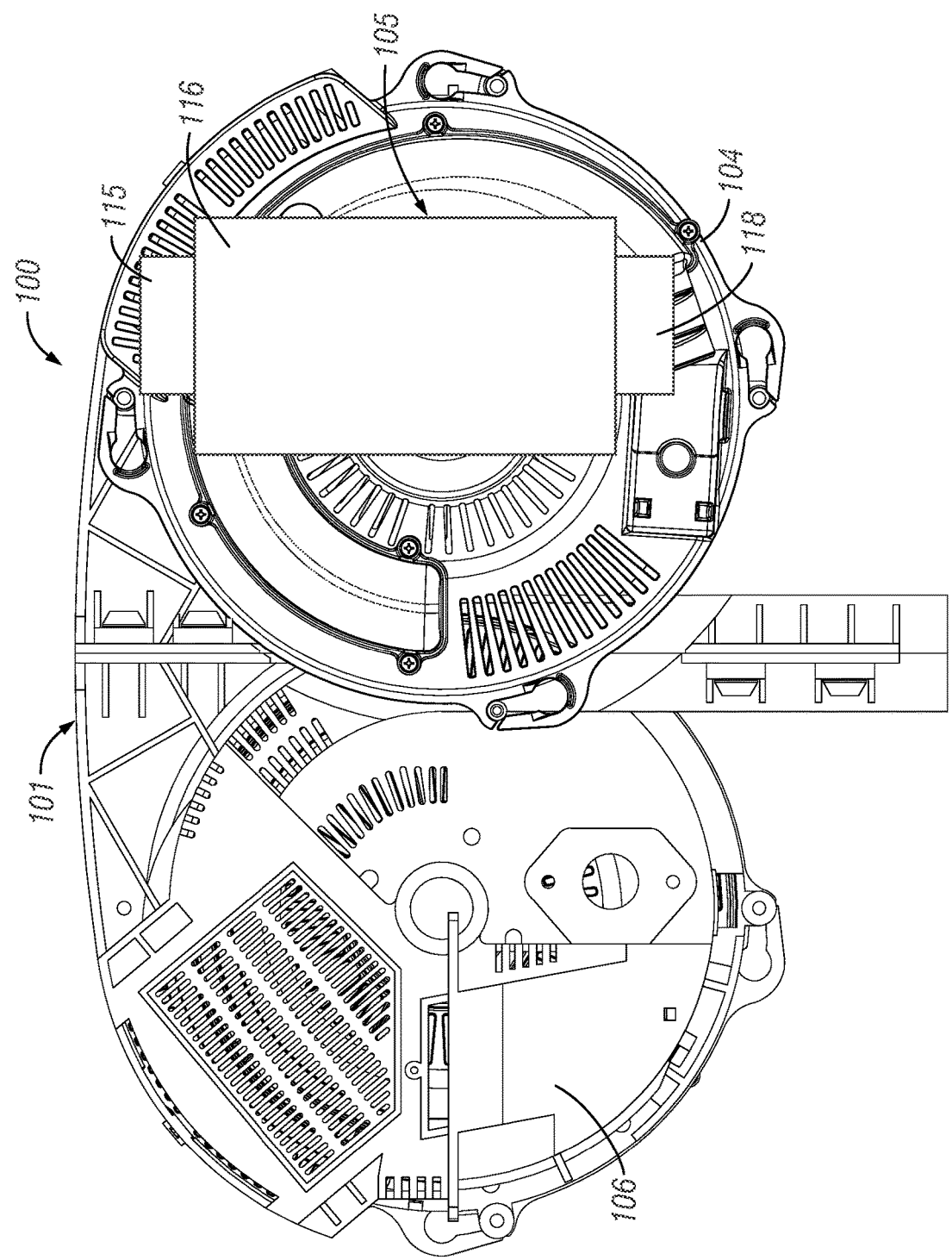
FIG. 10 is a side elevation view of the seed meter of FIG. 9.

FIGS. 9 and 10 show a seed meter assembly 100, which includes additional aspects of the invention. The seed meter assembly 100 shown in FIGS. 9 and 10, similar to that previously shown and described, include a central housing 101, first seed meter housing 102, and second seed meter housing 104. As with previously, the first seed meter housing 102 will cover a seed disc that is rotatably mounted therein, and can be collectively known as a first seed meter. The second seed meter housing 104 will also include a seed disc rotatably mounted therein, and can collectively be known as a second seed meter 104 of the seed meter assembly 100. Furthermore, a first seed pool 106 is associated with the first seed meter 102, and a second seed pool 107 is associated with the second seed meter 104.

In the configuration shown in FIGS. 9 and 10, each seed meter 102, 104 includes a dedicated pressure source 103, 105, integrated for use with each individual seed meter. For example, as shown in FIG. 9, a pressure source 103 is integrated with the first seed meter 102, and includes a first electric motor 110 and a first vacuum fan and/or other air source 112 including an exhaust 114. In addition, the second meter 104 includes a second air pressure source 105 comprising a second electrical motor 115 and a second fan or other air source 116 including an exhaust 118. The seed meter assembly 100 shows aspects that include two integrated air sources, one for each integrated meter 102, 104, in which each pressure source operates independently of the other for use when each meter and air source is needed, i.e., operated.

The pressure sources 103, 105 are electrically operated to provide for the independent and variable control of air pressure to each seed meter of a particular row unit. Therefore, the particular pressure source may need only be activated when a particular seed meter is activated. For example, when a seed associated with the first seed meter 102 is to be planted, the first pressure source 103 can be activated to begin providing the air pressure, either positive or negative, to the seed meter 102. The motor 110 will activate the fan 112 to provide either a negative or positive pressure to the meter 102, in which the seed will adhere at apertures in the disc rotating therein, as it rotates through the seed pool 106. The operation of the integrated pressure source 103 can be controlled and varied to account for the desired and/or efficient operation of the seed meter to best adhere the seed to the seed disc of the seed meter 102. However, when the second seed meter 104 is to be activated, such as when a particular part of the field is to receive a separate type, variety, and/or hybrid, of seed, the first pressure source 103 can be shut off, and the second pressure source 105 can be activated along with the seed meter 104. Therefore, the pressure source 105 can be activated along with the seed disc of the second meter 104 to provide for a pressure source within the meter 104 to adhere seed at the seed disc thereof, such as when the seed disc rotates through or adjacent the seed pool 107. The second pressure source 105 can provide a different and variable pressure amount and type than that of the first pressure source 103, in order to account for the different type, hybrid, or variety of seed being singulated and planted by the second seed meter 104. In addition, the first and second pressure sources can provide for the same or similar pressure types as well.

While it has been mentioned that the first and second meters 102, 104, as well as the first and second pressure sources 103, 105, are operated at a single time, it should be appreciated that the invention contemplates that the systems can always be running, with a baffle or other mechanism within the central seed meter housing 101 in order to only allow a single seed to be dispensed therefrom. For example, it may be beneficial and/or efficient to always provide a pressure source to a meter, even when said meter is not in use, such that the meter may begin in use without a lag. Thus, the continuation pressure may be provided by the non-planting seed meter to account for the same. However, the meters could be independently operated such that the pressure will begin instantaneously or slightly prior to the use of a particular seed meter as well. All combinations are considered. In addition, it should be appreciated that, while two seed meters and thus, two pressure sources are provided with the seed meter assembly 100 of FIGS. 9 and 10, the configuration, setup and use of the integrated pressure sources, such as that shown in FIGS. 9 and 10 could be used with any number of seed meters. For example, if more than two seed meters were to be used at a row unit, an additional pressure source could be added for each additional seed meter. The integration of an individual and electric pressure source is able to be used, in part, by the fact that the electric motors of each individual pressure source will not require much energy, and thus, the planter will not require any additional power source for operating the invention.

Figure 11:
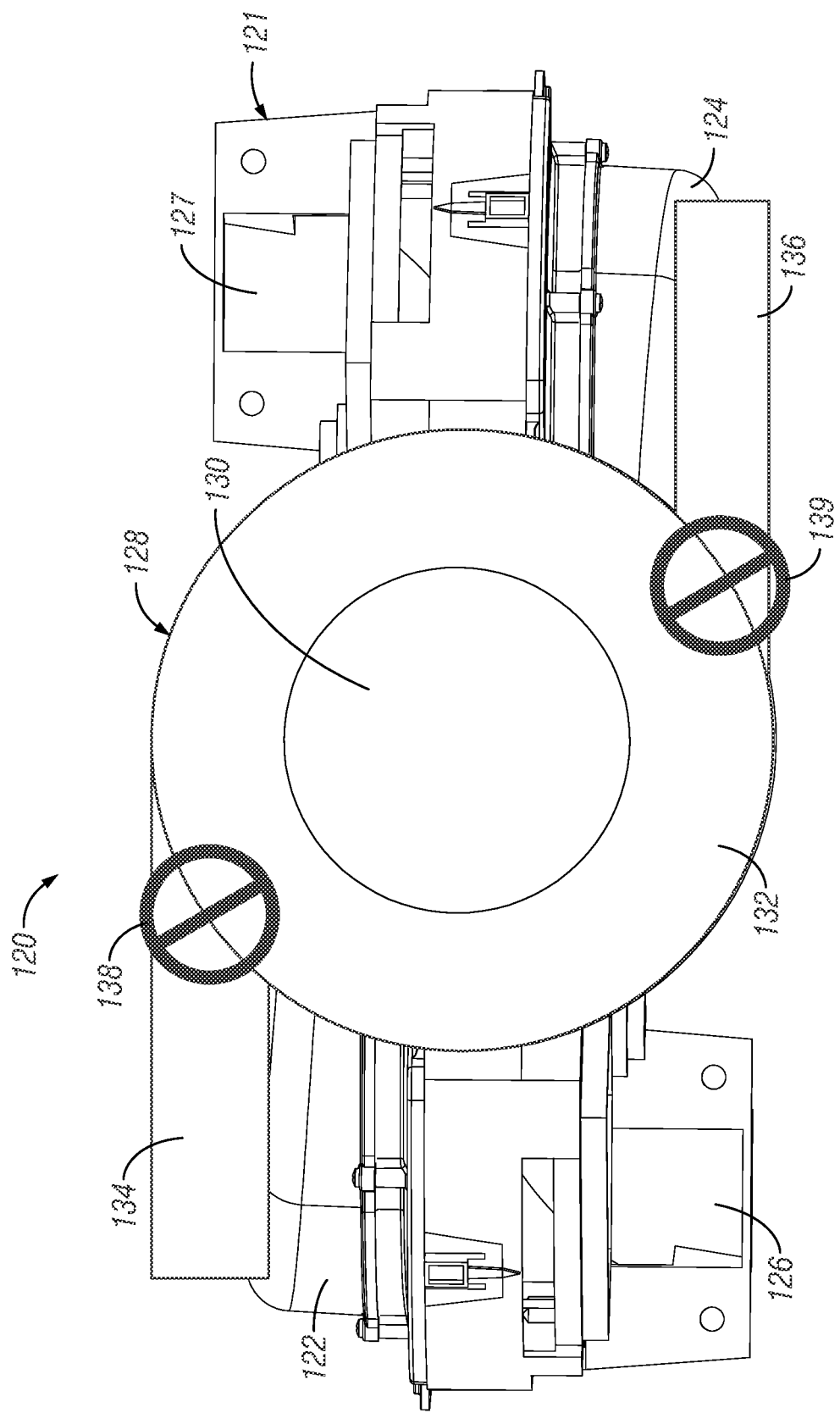
FIG. 11 is a top elevation view of a seed meter with two seed discs and a single air pressure source including valves for directing the air pressure source.
Figure 12:
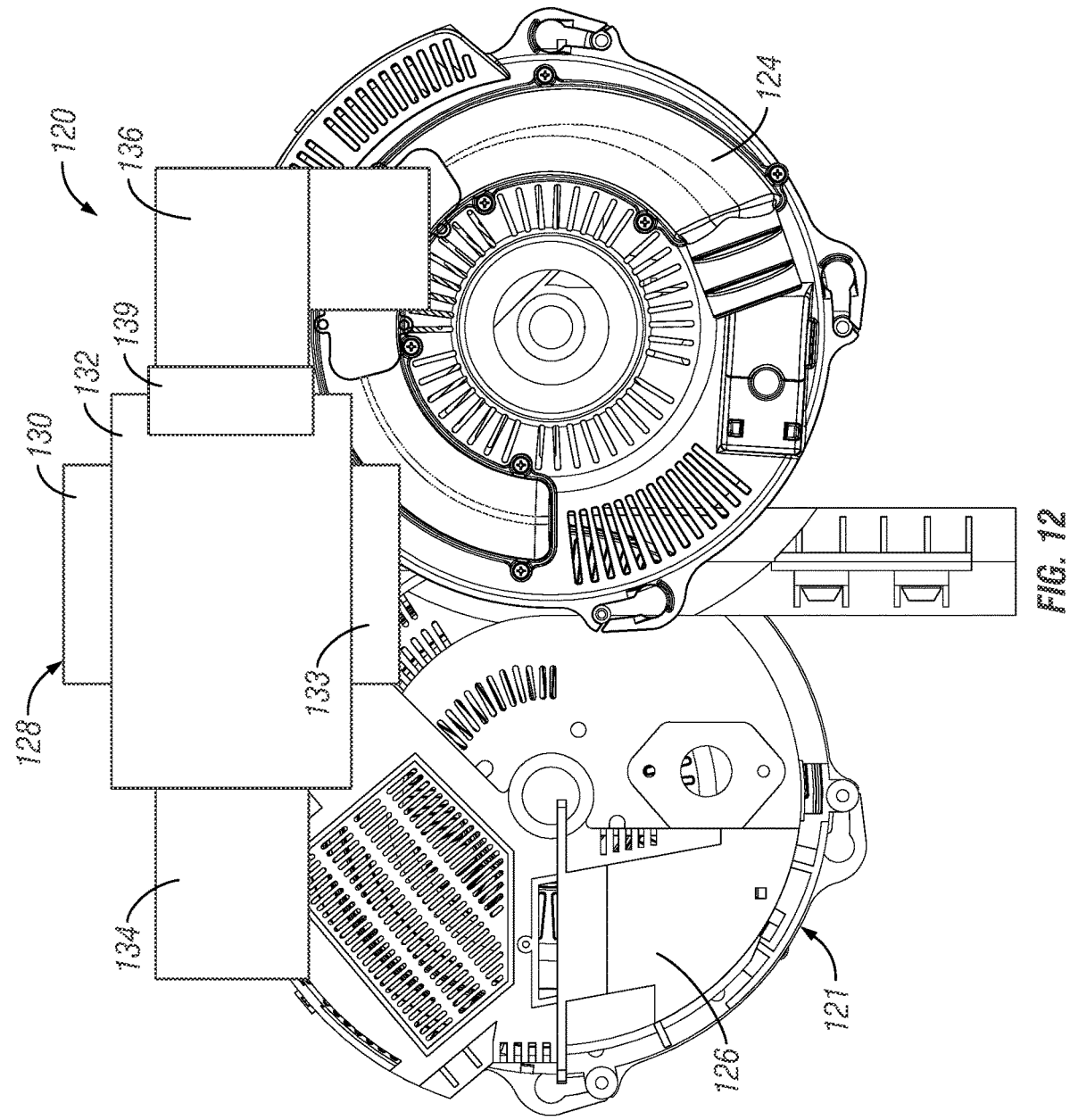
FIG. 12 is a side elevation view of the seed meter of FIG. 11.

FIGS. 11 and 12 show additional aspects of the invention, in which an electric and integrated pressure source 128 is utilized to provide air pressure to two seed meters 122, 124 of a seed meter assembly 120 of a row unit. The configuration includes a seed meter housing 121, seed pools 126, 127, for providing seed to discs of the first and second seed meters 122, 124. The integrated pressure source 128 includes an electric motor 130 and a vacuum fan or other air source 132, for providing the air pressure to the first and second seed meters 122, 124. In addition, a first duct 134 extends from the air pressure source 128 to the first seed meter 122, and a second duct 136 extends from the air pressure source 128 to the second seed meter 124.

However, the seed meter assembly 120 shown in FIGS. 11 and 12 differs from those previously shown and described, such as by the inclusion of first and second valves or baffles 138, 139. For example, the valves 138, 139 may be utilized to selectively open and close the air ducts 134, 136 such that the air pressure provided by the pressure source 128 is directed to only one of the first or second seed meters 122, 124. In other words, one air source 128 incorporates the use of automated or manually operated control valves 138, 139 to route air to or from one of two bifurcated paths to supply air to one of the two integrated seed meters 122, 124. The inclusion of the valves or baffles 138, 139, will increase the efficiency of the air pressure creates by the source 128 such that the full pressure created by the source will be dedicated to only one of the meters 122, 124. This can create the efficiency of the seed meter 120.

However, the valves can be operated, via either manually or automatically, to provide for any number or variations of air pressure from the pressure source 128 to either of the seed meters 122, 124 via the paths 134, 136. For example, when one of said seed meters is in use, it may be desired to have the valve completely open in order to provide a full amount of air pressure to said meter. The other said meter may be blocked completely of said air pressure, in such that the full air pressure is dedicated to the seed meter in use. In some situations, the valve for the seed meter not in use may be slightly opened such that the air pressure begins to be supplied to the seed meter not in use. This will begin providing pressure to the seed meter, such that when the meter begins operation, there will be less lag or potentially no lag in adhering the seed to the seed disc therein. This can aid in increasing the efficiency of the system, particularly when changing from one seed meter to the other.

As mentioned, the valves 138, 139 can be automated such that the system works to automatically open or close a valve as a particular seed meter is utilized. For example, the seed meters may be connected to a system, such as a GPS or other plotting system, to provide for a particular seed type, variety, or hybrid to be planted at a particular location in the field. The valves can be included in said system to know or learn of the changing of one seed being planted to the other via the seed meters. Thus, when the first seed meter 122 is to be shut off and the second seed meter 124 is to be operated, the valves can be alerted or know of such change, and can automatically open and close the proper valve in order to provide the air pressure to the seed meter that will be in use. As mentioned, the use of the valves to dedicate the air pressure to one of the plurality of seed meters associated with the system can increase the efficiency, such as by reducing the size of the fan or air source provider 132, as well as the power need for the motor 130, such as by requiring less pressure created by the air pressure source 128. Furthermore, while the system is shown to be used with two seed meters, it is to be appreciated that the inclusion of the valves can be incorporated with a seed meter of any number of seed discs and meters incorporated therein. Any addition of a duct and meter can include an addition of an additional valve positioned in or at the duct or between the additional seed meter and the pressure source.

Figure 13:
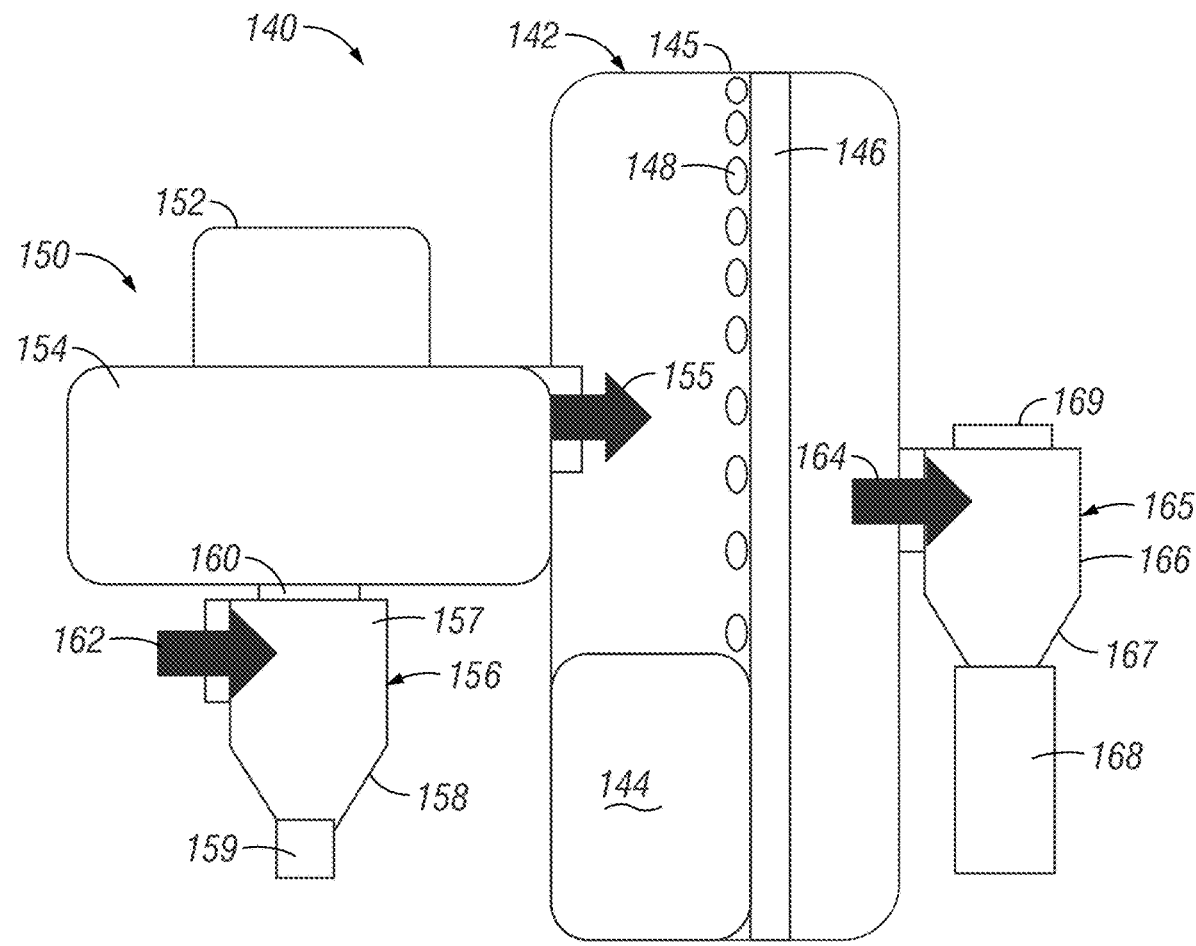
FIG. 13 is a rear elevation view of a seed meter with an integrated air pressure source and inlet and exhaust filtration systems integrated with the seed meter.

FIG. 13 shows yet additional aspects of the invention. As shown in FIG. 13, a seed meter assembly 140 is provided that includes a meter housing 142, a seed pool 144, and a seed disc 146 having seed apertures 148 thereon. The seed disc 146 is able to rotate within said seed meter housing 142. While only a single seed meter is shown in FIG. 13, it should be appreciated that additional seed meters could be included with the configuration shown and described, such as with the configurations previously shown and described. FIG. 13 also shows the seed meter assembly 140 includes an integrated and electric pressure source 150 comprising an electric motor 152 and a vacuum fan or other air source 154. The integrated pressure source 150 is utilized to provide a positive or negative pressure to the seed meter such that the seed 145 adheres at the seed apertures 148, such as that shown in FIG. 13.

However, additional aspects of FIG. 13 include inlet and exhaust filtration systems for use with the air pressure source 150 and seed meter assembly 140. An inlet filtration system 156 may be an integrated and electronic cyclonic dust separator. The cyclonic inlet filtration system 156 includes or comprises a cyclone body 157, a cone body 158, a dust drop 159, and a fan inlet 160. The inlet filtration system 156 utilizes cyclonic separation to remove particulates from the air before the air reaches the pressure source 150 and seed meter.

In a cyclonic separation system, such as that shown in FIG. 13, a high speed rotating air flow is established within the cyclone body 157. The air flows in a helical pattern, beginning at the top of the cyclone body and ending at the bottom end near the cone body 158, before exiting the cyclone body in a straight stream through the center of the cyclone body and out the top. Larger, i.e., denser, particles in the rotating stream have too much inertia to follow the tight curve of the stream in the suddenly upward direction, and strike the outside wall of the cyclone body 157, causing them to fall to the bottom of the system, where they can be removed or allowed to drop out of the dust drop 159. For example, as the helical stream of air reaches the conical section 158, the air makes a tight, upward turn and moves toward the fan inlet 160. The particles fall towards the dust drop 159, where they can are removed from the air stream. In a conical system such as that shown, as the rotating flow moves towards the conical section of the system, the rotational radius of the stream is reduced, thus separating smaller and smaller particles within the air. The cyclone geometry, together with the flow rate, defines the cut point of the cyclone. This is the size of the particle that will be removed from the stream with 50% efficiency. Particles larger than the cut point will be removed with greater efficiency and smaller particles with lower efficiency.

In the system shown in FIG. 13, air enters as shown in the direction of the arrow 162. This may be known as “dirty air”. The dirty air is rotated at a high speed rotational velocity within the cyclone body 157. As the air moves in the helical manner towards the conical section 158, the lighter air will then make a sharp turn and move upwards towards the fan inlet 160, in a substantially straight line. The larger and/or denser particles within the dirty air will not be able to make the turn, and will fall out the dust drop 159. Therefore, the system 156 provides for clean or cleaner air passing through the inlet 160 and into the vacuum or fan source 154 of the air pressure source 150. This “clean” air will pass from the source 154 via the arrow: 155 and into the meter housing 142 for providing the pressure to adhere the seed 145 at the apertures 148 of the seed disc 146. The inlet filtration system 156 can reduce the debris that might enter the air source, thus increasing the durability of the fan 154 and the meter 140, while also increasing the efficiency of the seed adhering at the seed disc.

In addition, the configuration shown in FIG. 13 also includes an exhaust filtration system 165. The exhaust filtration system 165 is also a cyclonic separation system, which comprises a cyclone body 166, cone body 167, debris enclosure 168, and clean exhaust port 169. The air which passes through the meter housing 142, which is shown by the arrow: 164 in FIG. 13, may pick up dust or coatings from the seed 145 that might contain airborne pesticides or other chemicals that have the capability of harming the field or environment. Therefore, it may be beneficial during the planting of a field to reduce the amount of airborne pesticides or chemicals that are introduced to the environment. As the air passes in the direction of the arrow: 164, it is rotated at a high speed within the cyclone body 166. Similar to that in the inlet filtration system 156, the high speed rotation of the air in the cyclone body 166 will cause the air to rotate in a helical manner towards the conical section 167 of the system 165. Near the bottom of the conical section 167, the air will sharply upturn and exit in a substantially straight stream through the center of the cyclone body 166 and upward out the clean exhaust port 169. The particles of the dust, coatings, pesticides, and/or other chemicals will be denser or otherwise larger than the air, and will not be able to make the turn from the conical section 167 and upwards through the exhaust port 169. Therefore, these denser particles will be directed via the cone section 167 into an enclosure 168. This enclosure can capture said particles, such that they are not introduced to the field or other environment, and can be disposed of in an environmentally safe manner. Therefore, the integrated cyclonic dust separator at the exhaust of the seed meter 140 will also provide benefits, such as protecting the environment.

Furthermore, it should be appreciated that it is not required that both the inlet and the exhaust filtration systems be utilized in a single system. For example, in some situations, only the inlet filtration system need be required for use with a particular seed meter. Otherwise, when planting a seed having a particular coating or using a particular pesticide, only the exhaust filtration system need be utilized in order to protect the environment. Furthermore, any combination of the systems may be utilized. For example, while a cyclonic separation filtration system has been shown and described, it should be appreciated that other types of filtration systems can be utilized with any of the seed meter systems including an integrated air pressure source. For example, a system using filters instead of a vortex separation could be included with a particular seed meter in order to clean the air inlet or exhaust of a system. Such systems could include the use of filters to remove solid particulates such as dust, pollen, or other chemicals from the air. Chemical air filters could also be used. The invention is not to be limited to the particular configuration shown and described.

Therefore, a planting implement has been shown and described which includes seed meters with an electric, integrated air pressure source at each row unit and/or seed meter for providing the pressure differential of the meter to aid in adhering a seed to a seed disc for planting. The invention contemplates numerous variations, options, and alternatives, and is not to be limited to the specific exemplary embodiments described herein. For example, numerous other types of motors, fans, air sources, filtration systems, seed meters, seed discs, seed types, varieties, and hybrids, and the like are all to be included as part of the invention. Furthermore, it should be appreciated that any of the aspects can be used with any type of seed, including seed hybrid, type, variety, or the like. This includes, but is not limited to, corn, soybean, cotton, sweetcorn, as well as generally any other crop. Those skilled in the art will appreciate the various other changes that may be included and still be within the scope of the invention.

What is claimed is:

1. A row unit of an agricultural implement, comprising:

a row unit frame;

a seed meter operatively connected to the row unit frame and comprising a housing and a seed disc rotatably positioned within the housing and including a plurality of seed apertures comprising a seed path, wherein the housing includes an air inlet; and an electric fluid pressure source operatively connected to the row unit frame separate from the air inlet of the seed meter housing and connected to the air inlet of the seed meter housing via a duct to provide a pressure differential at the seed apertures of the seed path to temporarily adhere a seed.

2. The row unit of claim 1, wherein the electric fluid pressure source provides a negative pressure at the seed apertures for adhering seed.

3. The row unit of claim 1, wherein the electric fluid pressure source provides a positive pressure at the seed apertures for adhering seed.

4. The row unit of claim 1, wherein the electric fluid pressure source comprises an electric fan and a motor.

5. The row unit of claim 1, wherein the electric fluid pressure source is supported by the row unit frame.

6. The row unit of claim 1, wherein the duct is positioned at a pressure source side of the housing of the seed meter.

7. An agricultural implement, comprising:
a plurality of row units operatively attached to a toolbar, each of said row units including:
a seed meter housing for substantially enclosing a seed disc configured to singulate and dispense seed, the seed meter housing including an air inlet; and
an electric fluid pressure source operatively connected to the seed meter housing via the air inlet and configured to provide a pressure differential for at least a portion of an interior of the seed meter housing to urge seed to temporarily adhere to the seed disc positioned therein;
wherein the electric fluid pressure source is separated from the air inlet of the seed meter housing and connected to the air inlet via a duct.

8. The agricultural implement of claim 7, wherein the electric fluid pressure source is positioned at the seed meter housing.

9. The agricultural implement of claim 7, wherein the electric fluid pressure source is positioned at a frame of a row unit.

10. The agricultural implement of claim 7, wherein the seed disc includes a seed side wherein seed is adhered and an opposite pressure side.

11. The agricultural implement of claim 10, wherein the electric fluid pressure source is operatively connected via the duct at the pressure side of the seed disc.

12. The agricultural implement of claim 7, wherein the electric fluid pressure source comprises a fan.

13. The agricultural implement of claim 12, further comprising:
a. an inlet filtration cyclonic dust separating system attached to the seed meter for the fluid pressure source and configured to reduce debris within the seed meter; and
b. an exhaust cyclonic dust separating system attached to an exhaust of the seed meter to capture exhausting meter air to reduce seed debris therefrom.

14. A method of planting a particulate material at a row unit of an agricultural implement that includes a plurality of row units, the method comprising:
singulating the particulate material with a seed disc and a singulator as the seed disc rotates in a seed meter housing;
providing a fluid pressure, via an electric fluid pressure source coupled to an air inlet of the seed meter housing, to the interior of the seed meter housing to adhere the particulate material to the seed disc as the seed disc rotates; and
dispensing the particulate material from the seed meter housing toward the ground;
wherein each row unit of the agricultural implement includes an independent electric fluid pressure source that is separated from the air inlet of the seed meter housing and connected thereto via a duct to provide the fluid pressure.

15. The method of claim 14, wherein the fluid pressure is a negative pressure.

16. The method of claim 14, wherein the electric fluid pressure source is positioned at the seed meter housing.

17. The method of claim 14, wherein the electric fluid pressure source is positioned at a frame of the row unit.

* * * * *